US006680009B2

(12) United States Patent
Harada et al.

(10) Patent No.: US 6,680,009 B2
(45) Date of Patent: Jan. 20, 2004

(54) OPTICAL FILTER COMPRISING TRANSPARENT SUPPORT AND FILTER LAYER HAVING THREE ABSORPTION MAXIMUMS

(75) Inventors: Toru Harada, Kanagawa (JP); Takumi Ando, Kanagawa (JP); Masaki Noro, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/899,124

(22) Filed: Jul. 6, 2001

(65) Prior Publication Data

US 2002/0017636 A1 Feb. 14, 2002

(30) Foreign Application Priority Data

Jul. 6, 2000 (JP) ....................................... 2000-204846

(51) Int. Cl.$^7$ .............................. F21V 9/04; G02B 5/22
(52) U.S. Cl. ........................ 252/587; 359/892; 313/479
(58) Field of Search ......................... 252/587; 359/892; 313/479

(56) References Cited

U.S. PATENT DOCUMENTS

| | | | | | |
|---|---|---|---|---|---|
| 5,354,514 | A | * | 10/1994 | Satake et al. | 252/587 |
| 5,413,971 | A | * | 5/1995 | McPherson | 252/587 |
| 5,804,102 | A | * | 9/1998 | Oi et al. | 252/587 |
| 5,945,209 | A | * | 8/1999 | Okazaki et al. | 359/892 |
| 6,309,564 | B1 | * | 10/2001 | Harada et al. | 252/587 |
| 6,344,272 | B1 | * | 2/2002 | Oldenburg et al. | 252/587 |
| 6,522,463 | B1 | * | 2/2003 | Shimomura et al. | 252/587 |
| 2001/0053034 | A1 | * | 12/2001 | Ikuhara et al. | 359/892 |

FOREIGN PATENT DOCUMENTS

WO 99/60430 * 11/1999

* cited by examiner

*Primary Examiner*—Philip Tucker
(74) *Attorney, Agent, or Firm*—Burns, Doane, Swecker & Mathis, LLP

(57) ABSTRACT

An optical filter comprises a transparent support and a filter layer. The filter layer has at least three absorption maximums in the wavelength region of 750 to 1,100 nm. Each of the three absorption maximums is in the wavelength regions of 750 to 850 nm, 851 to 950 nm, and 951 to 1,100 nm.

18 Claims, 1 Drawing Sheet

OPTICAL FILTER COMPRISING TRANSPARENT SUPPORT AND FILTER LAYER HAVING THREE ABSORPTION MAXIMUMS

FIELD OF THE INVENTION

The present invention relates to an optical filter comprising a transparent support and a filter layer. In more detail, the invention relates to an optical filter used in a display device such as a plasma display panel (PDP), a liquid crystal display device (LCD), an electroluminescence display (ELD), a fluorescent indicator tube or a field emission display to prevent a remote-control from faulty working and to improve the color reproducibility of the display.

BACKGROUND OF THE INVENTION

A display device such as a liquid crystal display (LCD), a plasma display panel (PDP), an electroluminescence display (ELD), a cathode-ray tube (CRT), a fluorescent indicator tube or a field emission display displays a color image with a combination of the three primary colors (i.e., red, blue, green). However, it is very difficult (practically impossible) to use the ideal three primary colors. For example, the plasma display panel uses phosphors of the three primary colors, which emit light containing an unnecessary component (in the wavelength region of 500 to 620 nm).

Therefore, it has been proposed to correct the color balance of the displayed image by using an optical filter absorbing the unnecessary component. The optical filter for the color correction is described in Japanese Patent Provisional Publication Nos. 58(1983)-153904, 61(1986)-188501, 3(1991)-231988, 5(1993)-205643, 9(1997)-145918, 9(1997)-306366 and 10(1998)-26704.

Further, it has been reported that infrared rays (mainly in the wavelength region of 750 to 1,100 nm) emitted from the display device may cause faulty working of a remote control using an infrared ray. For solving this problem, an infrared rays-absorbing filter is used. Dyes used in the infrared rays-absorbing filter are described in U.S. Pat. No. 5,945,209.

SUMMARY OF THE INVENTION

An object of the present invention is to provide an optical filter selectively removing infrared rays.

Another object of the present invention is to provide an optical filter selectively removing light impairing the color purity of displayed images as well as the infrared rays.

A further object of the invention is to provide a plasma display panel that does not cause faulty working of a remote control.

A furthermore object of the invention is to provide a plasma display panel improved in balance of a displayed image.

The present invention provides an optical filter which comprises a transparent support and a filter layer, wherein the filter layer has at least three absorption maximums in the wavelength region of 750 to 1,100 nm, each of said three absorption maximums is in the wavelength regions of 750 to 850 nm, 851 to 950 nm, and 951 to 1,100 nm.

The invention also provides a plasma display panel having a display surface covered with an optical filter which comprises a transparent support and a filter layer, wherein the filter layer has at least three absorption maximums in the wavelength region of 750 to 1,100 nm, each of said three absorption maximums is in the wavelength regions of 750 to 850 nm, 851 to 950 nm, and 951 to 1,100 nm.

DETAILED DESCRIPTION OF THE INVENTION

[Filter Layer]

Figure 1:
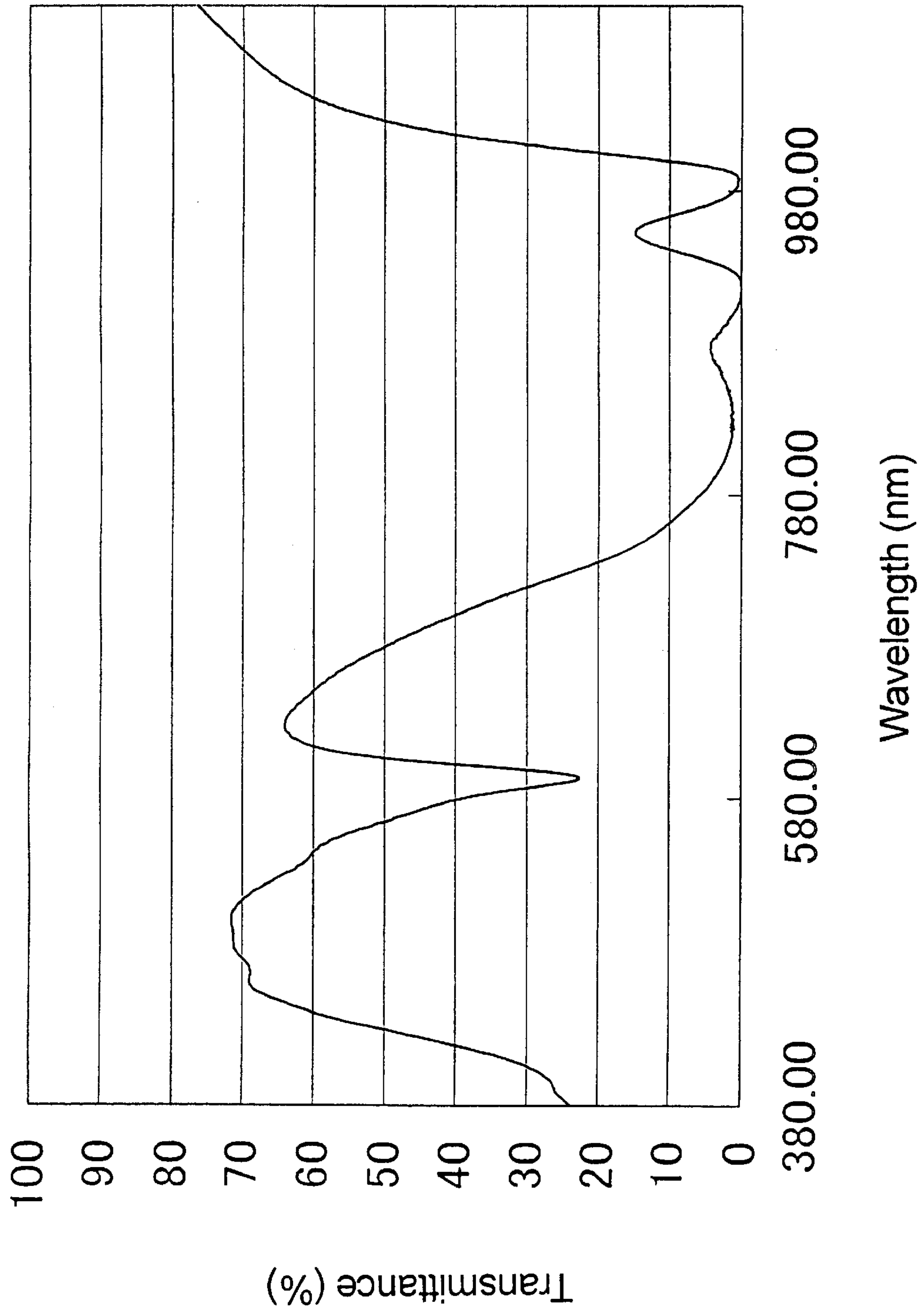
FIG. 1 is a graph showing absorption spectrum of an optical filter prepared in Example 5.

The optical filter comprises a transparent support and a filter layer. The filter layer has an absorption maximum in the wavelength region of 750 to 850 nm, another absorption maximum in the wavelength region of 851 to 950 nm, and a third absorption maximum in the wavelength region of 951 to 1,100 nm. The filter layer preferably has an absorption maximum in the wavelength region of 790 to 845 nm, another absorption maximum in the wavelength region of 860 to 945 nm, and a third absorption maximum in the wavelength region of 960 to 1,050 nm, and more preferably has an absorption maximum in the wavelength region of 800 to 840, another absorption maximum in the wavelength region of 870 to 940 nm, and a third absorption maximum in the wavelength region of 970 to 1,030 nm.

The optical filter has a transmittance preferably in the range of 0.01 to 30%, more preferably in the range of 0.05 to 20%, and most preferably in the range of 0.1 to 10% at each of the absorption maximums.

The above-described absorption spectrum can be formed in the optical filter by using a colorant (a dye or a pigment). A dye is preferred to a pigment.

A dye having an absorption maximum in the wavelength region of 750 to 1,100 nm preferably has a sharp spectrum peak in the region to scarcely absorb light in the visible wavelength region (400 to 700 nm), which is emitted from a phosphor. A dye in an aggregated form is preferably used to obtain the above-mentioned sharp spectrum peak.

A dye in the aggregated form shows a sharp spectrum peak because the aggregated dye forms a so-called J-band. Various publications (e.g., Photographic Science and Engineering Vol. 18, No 323–335(1974)) describe the aggregated dye and J-band. The aggregated dye generally exhibits the absorption maximum at a longer wavelength than the dye in a solution. Therefore, it can be easily determined by the position of the absorption maximum whether the dye is in an aggregated form or not.

In the present specification, the dye giving the absorption maximum at a wavelength longer than the dye in a solution by 30 nm or more is regarded as being in an aggregated form. The wavelength shift is preferably not less than 35 nm, more preferably not less than 40 nm, and most preferably not less than 45 nm.

Some dyes form aggregates when they are only dissolved in water. The aggregated dye is generally formed by adding gelatin or salts (e.g., barium chloride, potassium chloride, sodium chloride, calcium chloride) into an aqueous solution of the dye. It is particularly preferred to add gelatin into the aqueous solution.

The aggregates of the dye may be in the form of dispersion of solid fine particles, which can be prepared by means of known dispersing machines. Examples of the dispersing machines include a ball mill, an oscillating ball mill, a planetary ball mill, a sand mill, a colloid mill, a jet mill and a roll mill. Japanese Patent Provisional Publication No. 52(1977)-92716 and International Patent No. 88/074794 describe dispersing machines. A vertical or horizontal medium dispersing machine is preferred.

The dispersing process can be conducted in the presence of a medium (e.g., water, alcohols). A dispersing surface active agent is preferably used for the process. An anionic surface active agent (described in Japanese Patent Provisional Publication No. 52(1977)-92716 and International Patent No. 88/074794) is preferably used as the dispersing surface active agent. The process can also be conducted by using an anionic polymer, a nonionic surface active agent or a cationic surface active agent.

Powdery fine particles of the dye can be prepared by dissolving the dye in an appropriate solvent and adding a poor solvent to precipitate the fine particles. The dispersing surface active agent can be also used in the precipitating process. Crystallites of the dye, which are also classified into aggregates of the dye, can be obtained by the steps of dissolving the dye by adjusting pH value and changing the pH value to precipitate the crystallites.

In the case that the aggregated dye is in the form of fine particles (or crystallites), the average grain size (diameter) is preferably in the range of 0.01 to 10 μm.

The dye used in an aggregated form preferably is a methine dye (e.g., a cyanine dye, a merocyanine dye, an arylidene dye, an oxonol dye, a styryl dye), and more preferably is a cyanine dye or an oxonol dye.

The cyanine dye is defined by the following formula.

*Bs=Lo-Bo*

In the formula, Bs is a basic nucleus; Bo is an onium form of a basic nucleus; and Lo is a methine chain consisting of an odd number of methines.

The cyanine dye (particularly in an aggregated form) is preferably represented by the formula (I).

(I)

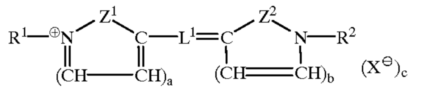

In the formula (I), each of $Z^1$ and $Z^2$ independently is a group of non-metallic atoms forming a five-membered or six-membered nitrogen-containing heterocyclic ring. The nitrogen-containing heterocyclic ring may be condensed with another heterocyclic ring, an aromatic ring or an aliphatic ring. Examples of the nitrogen-containing heterocyclic rings and the condensed rings include oxazole ring, isoxazole ring, benzoxazole ring, naphthoxazole ring, oxazolocarbazole ring, oxazolodibenzofuran ring, thiazole ring, benzothiazole ring, naphthothiazole ring, indolenine ring, benzoindolenine ring, imidazole ring, benzimidazole ring, naphthoimidazole ring, quinoline ring, pyridine ring, pyrrolopyridine ring, furopyrrole ring, indolizine ring, imidazoquinoxaline ring and quinoxaline ring. A five-membered nitrogen-containing heterocyclic ring is preferred to a six-membered ring. A five-membered nitrogen-containing heterocyclic ring is preferably condensed with benzene or naphthalene ring. Benzothiazole ring, naphthothiazole ring, indolenine ring and benzoindolenine ring are preferred.

The nitrogen-containing heterocyclic ring and the condensed ring can have substituent groups. Examples of the substituent groups include a halogen atom, cyano, nitro, hydroxyl, carboxyl, amino, formyl, carbamoyl, ureido, urethane, mercapto, sulfo, sulfamoyl, an aliphatic group, an aromatic group, a heterocyclic group, —O—R, —CO—R, —CO—O—R, —O—CO—R, —NH—R, $—NR_2$, —NH—CO—R, —CO—NH—R, $—CO—NR_2$, —NH—CO—NH—R, $—NH—CO—NR_2$, —NH—CO—O—R, —S—R, $—SO_2—R$, $—SO_2—O—R$, $—NH—SO_2—R$, $—SO_2—NH—R$ and $—SO_2—NR_2$. R is independently an aliphatic group, an aromatic group or a heterocyclic group. Hydrogen atom can be dissociated from carboxyl or sulfo. Carboxyl or sulfo can also be in the form of a salt.

In the present specification, the aliphatic group means an alkyl group, a substituted alkyl group, an alkenyl group, a substituted alkenyl group, an alkynyl group or a substituted alkynyl group.

The alkyl group can have a cyclic structure. The alkyl group of a chain structure can be branched. The alkyl group preferably has 1 to 20 carbon atoms, more preferably has 1 to 12 carbon atoms, and most preferably has 1 to 8 carbon atoms. Examples of the alkyl groups include methyl, ethyl, propyl, isopropyl, butyl, t-butyl, cyclopropyl, cyclohexyl and 2-ethylhexyl.

The alkyl moiety of the substituted alkyl group is the same as the above-described alkyl group. Examples of the substituent groups of the substituted alkyl groups include a halogen atom, hydroxyl, carboxyl, amino, formyl, carbamoyl, ureido, urethane, mercapto, sulfo, sulfamoyl, an aromatic group, a heterocyclic group, —O—R, —CO—R, —CO—O—R, —O—CO—R, —NH—R, $—NR_2$, —NH—CO—R, —CO—NH—R, $—CO—NR_2$, —NH—CO—NH—R, $—NH—CO—NR_2$, —NH—CO—O—R, —S—R, $—SO_2—R$, $—SO_2—O—R$, $—NH—SO_2—R$, $—SO_2—NH—R$ and $—SO_2—NR_2$. R is independently an aliphatic group, an aromatic group or a heterocyclic group. Hydrogen atom can be dissociated from carboxyl or sulfo. Carboxyl or sulfo can also be in the form of a salt.

Examples of the substituted alkyl groups include 2-hydroxylethyl, 2-carboxyethyl, 2-methoxyethyl, 2-diethylaminoethyl, 3-sulfopropyl, 4-sulfobutyl, benzyl and phenethyl.

The alkenyl group can have a cyclic structure. The alkenyl group of a chain structure can be branched. The alkenyl group preferably has 2 to 20 carbon atoms, more preferably has 2 to 12, and most preferably has 2 to 8 carbon atoms. Examples of the alkenyl group include vinyl, allyl, 1-propenyl, 2-butenyl, 2-pentenyl and 2-hexenyl.

The alkenyl moiety of the substituted alkenyl group is the same as the above-described alkenyl group. Examples of the substituent groups of the substituted alkenyl groups are the same as the substituent groups of the substituted alkyl groups.

The alkynyl group can have a cyclic structure. The alkynyl group of a chain structure can be branched. The alkynyl group preferably has 2 to 20 carbon atoms, more preferably 2 to 12 carbon atoms, and most preferably 2 to 8 carbon atoms. Examples of the alkynyl group include ethynyl and 2-propynyl.

The alkynyl moiety of the substituted alkynyl group is the same as the above-described alkynyl group. Examples of the substituent groups of the substituted alkynyl groups are the same as the substituent groups of the substituted alkyl groups.

In the present specification, the aromatic group means an aryl group or a substituted aryl group.

The aryl group preferably has 6 to 25 carbon atoms, more preferably has 6 to 15 carbon atoms, and most preferably has 6 to 10 carbon atoms. Examples of the aryl group include phenyl and naphthyl.

The aryl moiety of the substituted aryl group is the same as the above-described aryl group. Examples of the substituent groups of the substituted aryl groups include a halogen atom, cyano, nitro, hydroxyl, carboxyl, amino, formyl, carbamoyl, ureido, urethane, mercapto, sulfo, sulfamoyl, an aliphatic group, an aromatic group, a heterocyclic group, —O—R, —CO—R, —CO—O—R, —O—CO—R, —NH—R, —$NR_2$, —NH—CO—R, —CO—NH—R, —CO—$NR_2$, —NH—CO—NH—R, —NH—CO—$NR_2$, —NH—CO—O—R, —S—R, —$SO_2$—R, —$SO_2$—O—R, —NH—$SO_2$—R, —$SO_2$—NH—R and —$SO_2$—$NR_2$. R is independently an aliphatic group, an aromatic group or a heterocyclic group. Hydrogen atom can be dissociated from carboxyl or sulfo. Carboxyl or sulfo can also be in the form of a salt.

Examples of the substituted aryl groups include 4-carboxyphenyl, 4-acetamidophenyl, 3-methanesulfoneamidophenyl, 4-methoxyphenyl, 3-carboxyphenyl, 3,5-dicarboxyphenyl, 4-methanesulfoneamidophenyl and 4-butanesulfoneamidophenyl.

In the present specification, the heterocyclic group means a non-substituted heterocyclic group or a substituted heterocyclic group. The heterocyclic ring of the heterocyclic group is preferably 5-membered ring or 6-membered ring. The heterocyclic ring can be condensed with an aliphatic ring, an aromatic ring or another heterocyclic ring. Examples of the heterocyclic rings and the condensed rings include pyridine ring, piperidine ring, furan ring, furfuran ring, thiophene ring, pyrrole ring, quinoline ring, morpholine ring, indole ring, imidazole ring, pyrazole ring, carbazole ring, phenothiazine ring, phenoxazine ring, indoline ring, thiazole ring, pyrazine ring, thiadiazine ring, benzoquinoline ring and thiadiazole ring.

Examples of the substituent groups of the substituted heterocyclic groups are the same as the substituent groups of the substituted aryl groups.

In the formula (I), each of $R^1$ and $R^2$ independently is an aliphatic group or an aromatic group. The aliphatic group and the aromatic group are defined above.

In the formula (I), $L^1$ is a methine chain consisting of an odd number of methines. $L^1$ preferably is a methine chain consisting of five or seven methines. The methine chain can have a substituent group. The substituent group is preferably placed at the center methine (i.e., mesoposition) of the chain. Examples of the substituent groups include a halogen atom, cyano, nitro, hydroxyl, carboxyl, amino, formyl, carbamoyl, ureido, urethane, mercapto, sulfo, sulfamoyl, an aliphatic group, an aromatic group, a heterocyclic group, —O—R, —CO—R, —CO—O—R, —O—CO—R, —NH—R, —$NR_2$, —NH—CO—R, —CO—NH—R, —CO—$NR_2$, —NH—CO—NH—R, —NH—CO—$NR_2$, —NH—CO—O—R, —S—R, —$SO_2$—R, —$SO_2$—O—R, —NH—$SO_2$—R, —$SO_2$—NH—R and —$SO_2$—$NR_2$. R is independently an aliphatic group, an aromatic group or a heterocyclic group. Hydrogen atom can be dissociated from carboxyl or sulfo. Carboxyl or sulfo can also be in the form of a salt.

The methine chain may have two substituent groups that are connected with each other to form a five-membered ring or a six-membered ring.

In the formula (I), each of a, b and c independently is 0 or 1. Each of a and b preferably is 0. In the case that the cyanine dye has an anionic substituent (such as sulfo or carboxyl) to form an inner salt, c is 0.

In the formula (I), $X^1$ is an anion. Examples of the anions include halide ions ($Cl^-$, $Br^-$, $I^-$), p-toluenesulfonate ion, ethylsulfate ion, $PF6^-$, $BF4^-$ and $ClO4^-$.

The cyanine dye preferably has carboxyl or sulfo as a substituent group.

Examples of the cyanine dyes represented by the formula (I) are shown below.

(I-1)

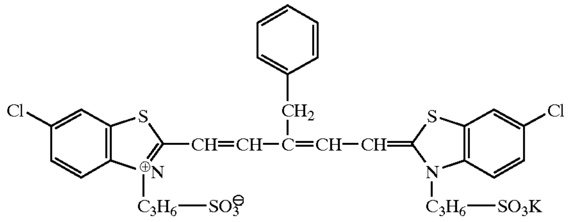

(I-2)

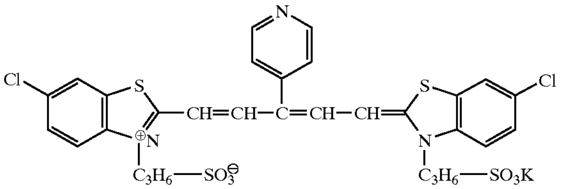

(I-3)

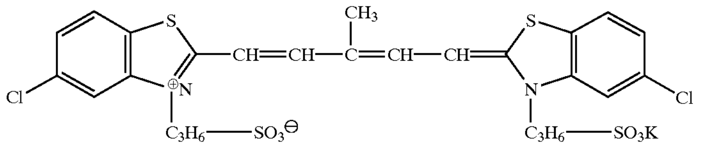

(I-4)

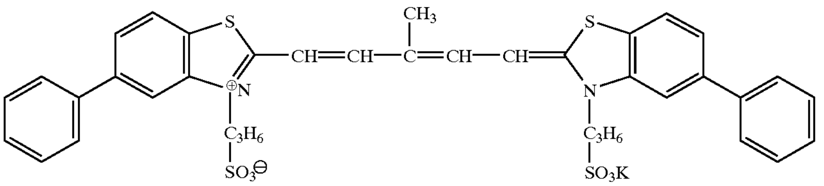

-continued
(I-5)
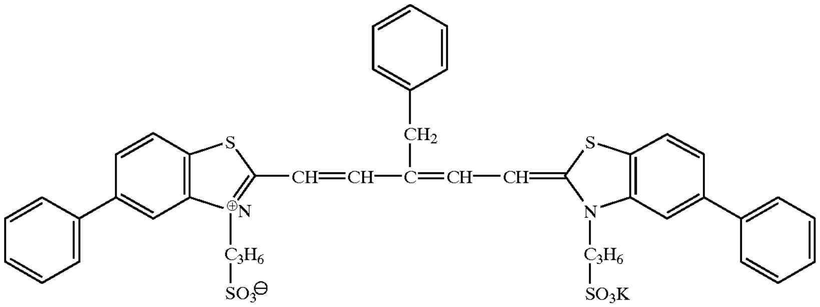
(I-6)
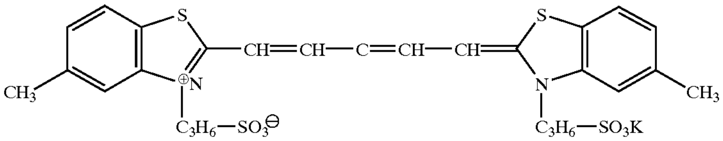
(I-7)
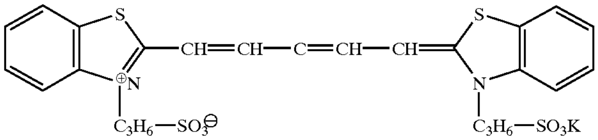
(I-8)
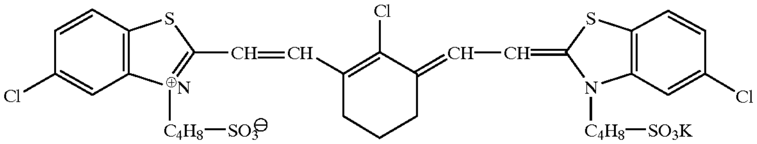
(I-9)
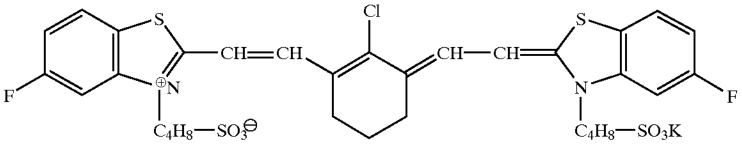
(I-10)
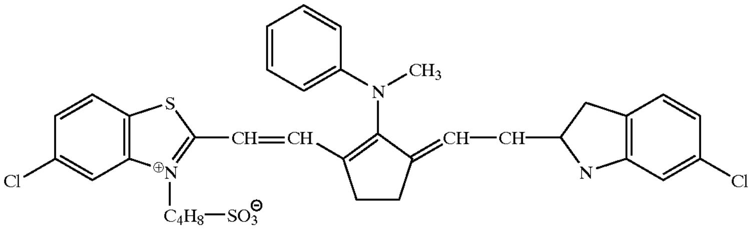
(I-11)
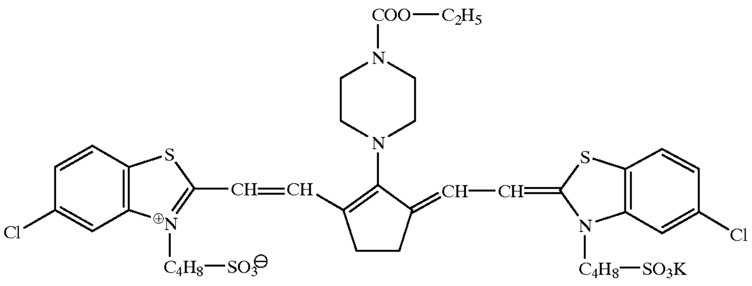

-continued
(I-12)
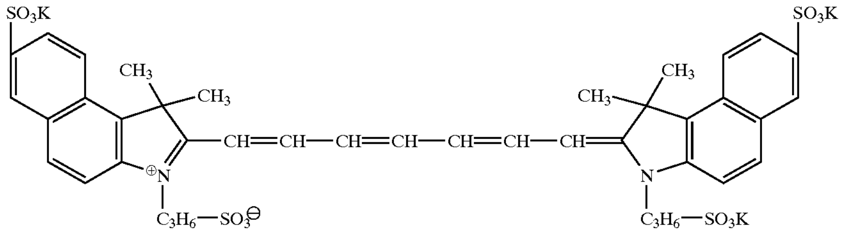
(I-13)
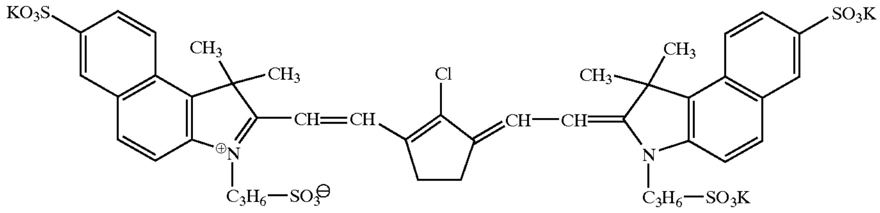
(I-14)
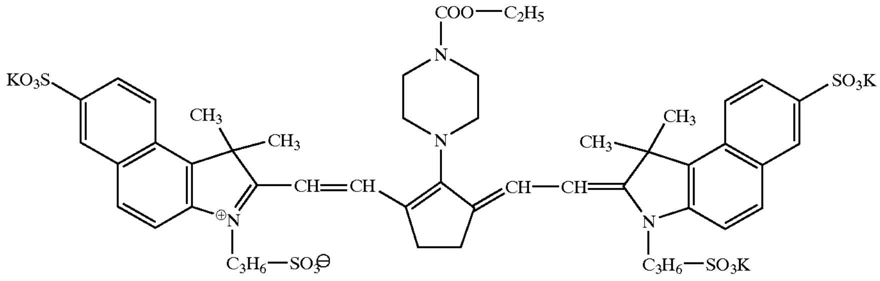
(I-15)
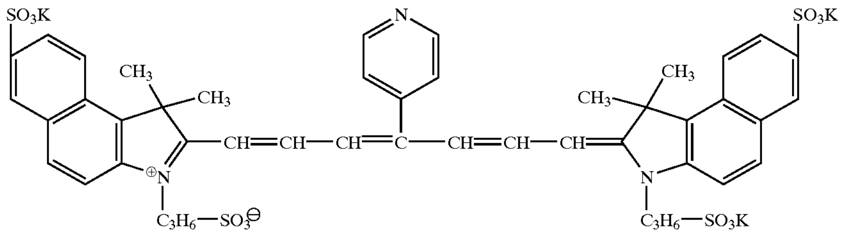
(I-16)
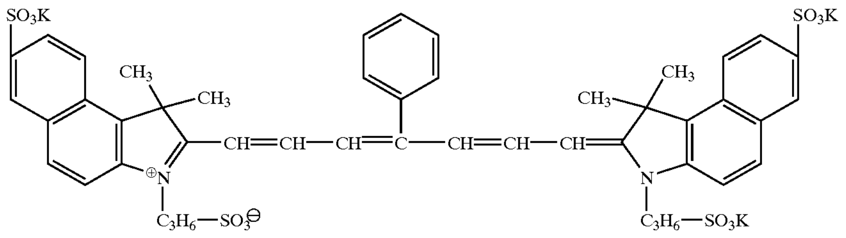
(I-17)
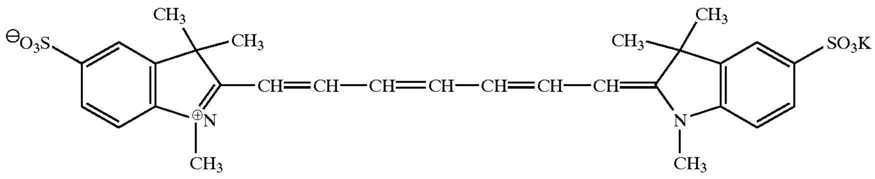

-continued
(I-18)
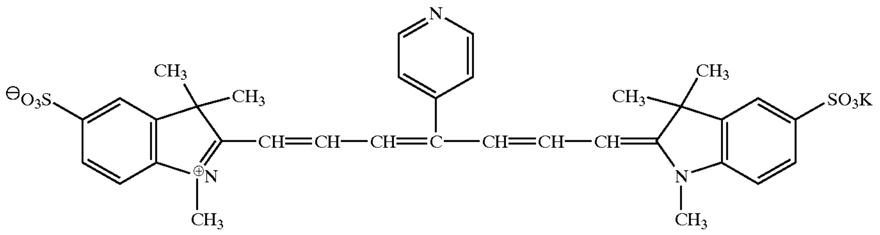
(I-19)
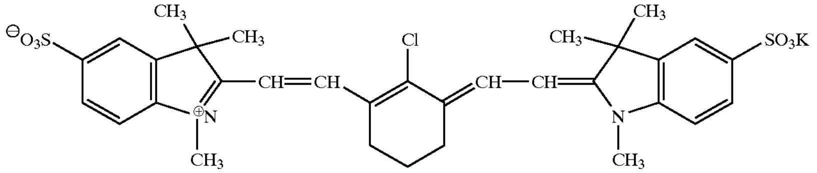
(I-20)
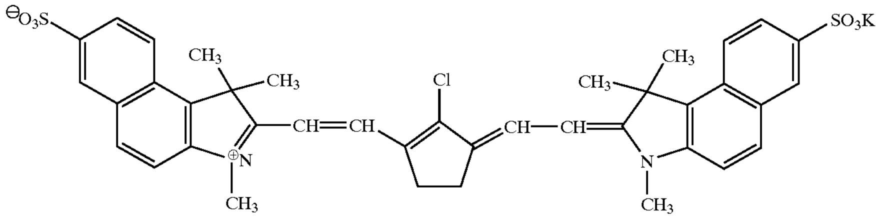
(I-21)
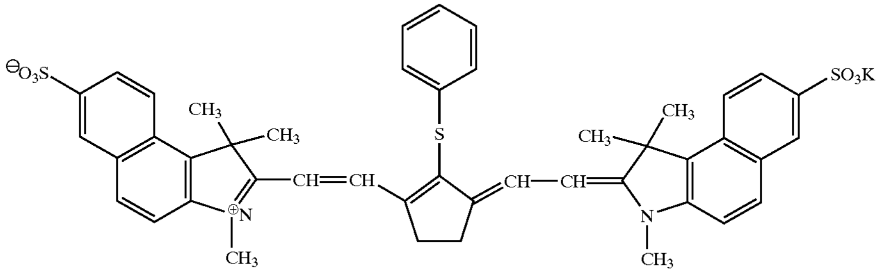
(I-22)
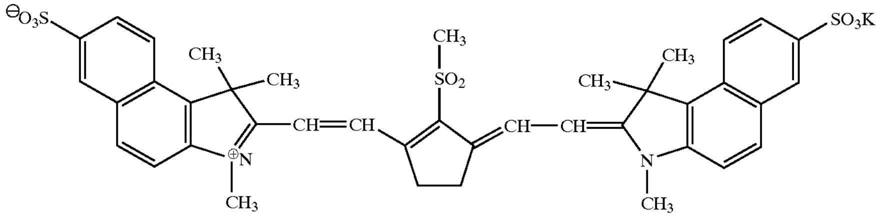
(I-23)
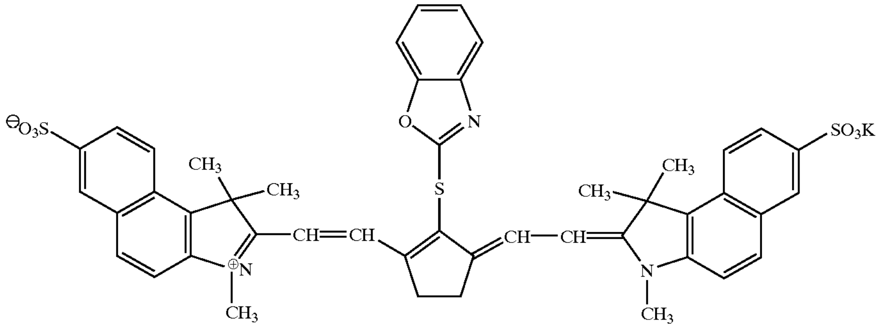

The cyanine dyes can be synthesized by referring to the descriptions of "Heterocyclic Compounds Cyanine Dyes and Related Compounds" by F. M. Harmer (John Wiley & Sons, 1964); "Heterocyclic Compounds Special Topics in Heterocyclic Chemistry" chapter 18, section 14, pp. 482–515, by D. M. Sturmer (John Wiley & Sons, 1977); "Rodds Chemistry of Carbon Compounds" 2nd. Ed. vol. IV, part B, chapter 15, pp. 369–422 (Elsevier Science Publishing Company Inc., 1977); and Japanese Patent Provisional Publication Nos. 5(1993)-88293 and 6(1994)-313939.

The oxonol dye is defined by the following formula.

*Ak=Lo–Ae*

In the formula, Ak is an acidic nucleus in a keto type; Ae is an acidic nucleus in an enol type; and Lo is a methine chain consisting of an odd number of methines.

The oxonol dye (particularly in an aggregated form) is preferably represented by the formula (II).

(II)

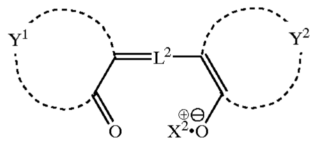

In the formula (II), each of $Y^1$ and $Y^2$ independently is a group of non-metallic atoms forming an aliphatic ring or a heterocyclic ring. A heterocyclic ring is preferred to an aliphatic ring. Examples of the aliphatic rings include indanedione ring. Examples of the heterocyclic ring include 5-pyrazolone ring, isoxazolone ring, barbituric acid ring, pyridone ring, rhodanine ring, pyrazolidinedione ring, pyrazolopyridone ring and merdoramic acid ring. 5-Pyrazolone ring and barbituric acid ring are preferred.

The aliphatic ring and the heterocyclic ring can have a substituent group. Examples of the substituent groups include a halogen atom, cyano, nitro, hydroxyl, carboxyl, amino, formyl, carbamoyl, ureido, urethane, mercapto, sulfo, sulfamoyl, an aliphatic group, an aromatic group, a heterocyclic group, —O—R, —CO—R, —CO—O—R, —O—CO—R, —NH—R, $—NR_2$, —NH—CO—R, —CO—NH—R, $—CO—NR_2$, —NH—CO—NH—R, $—NH—CO—NR_2$, —NH—CO—O—R, —S—R, $—SO_2—R$, $—SO_2—O—R$, $—NH—SO_2—R$, $—SO_2—NH—R$ and $—SO_2—NR_2$. R is independently an aliphatic group, an aromatic group or a heterocyclic group. Hydrogen atom can be dissociated from carboxyl or sulfo. Carboxyl or sulfo can also be in the form of a salt.

In the formula (II)), $L^2$ is a methine chain consisting of an odd number of methines. $L^2$ preferably is a methine chain consisting of three, five or seven methines, and more preferably is a methine chain consisting of five methines. The methine chain can have a substituent group. The substituent group is preferably placed at the center methine (i.e., meso-position) of the chain. Examples of the substituent groups include a halogen atom, cyano, nitro, hydroxyl, carboxyl, amino, formyl, carbamoyl, ureido, urethane, mercapto, sulfo, sulfamoyl, an aliphatic group, an aromatic group, a heterocyclic group, —O—R, —CO—R, —CO—O—R, —O—CO—R, —NH—R, $—NR_2$, —NH—CO—R, —CO—NH—R, $—CO—NR_2$, —NH—CO—NH—R, $—NH—CO—NR_2$, —NH—CO—O—R, —S—R, $—SO_2—R$, $—SO_2—O—R$, $—NH—SO_2—R$, $—SO_2—NH—R$ and $—SO_2—NR_2$. R is independently an aliphatic group, an aromatic group or a heterocyclic group. Hydrogen atom can be dissociated from carboxyl or sulfo. Carboxyl or sulfo can also be in the form of a salt.

The methine chain may have two substituent groups that are connected with each other to form a five-membered ring or a six-membered ring.

In the formula (II), $X^2$ is hydrogen or a cation. Examples of the cations include alkali metal ions ($Na^+$, $K^+$), ammonium ion, triethylammonium ion, triethylammonium ion, pyridinium ion and tetrabutylammonium ion.

Examples of the oxonol dyes are shown below.

(II-1)

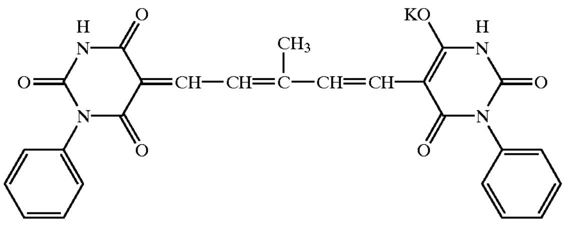

(II-2)

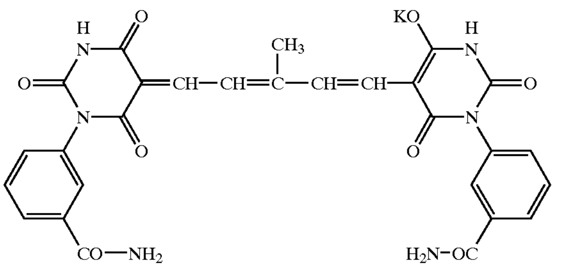

(II-3)

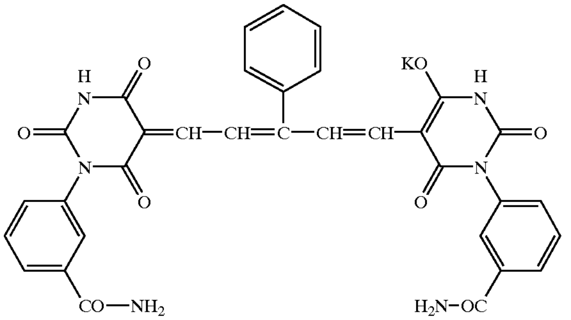

(II-4)

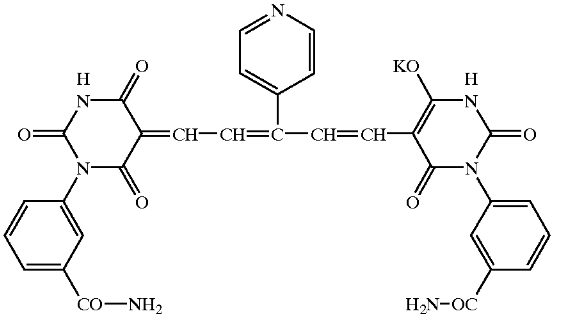

-continued
(II-5)
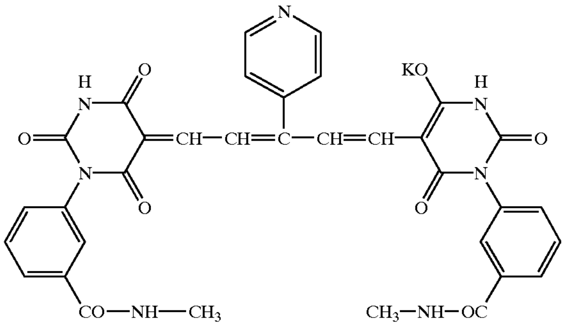
(II-6)
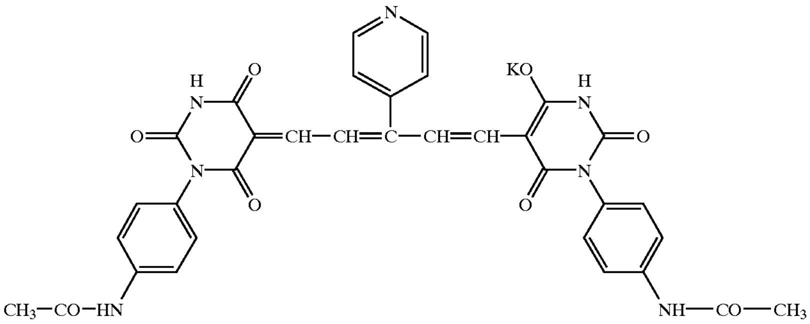
(II-7)
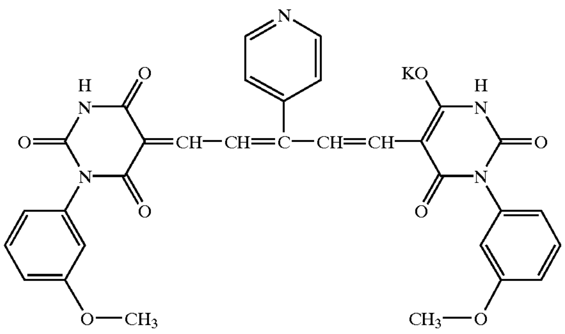
(II-8)
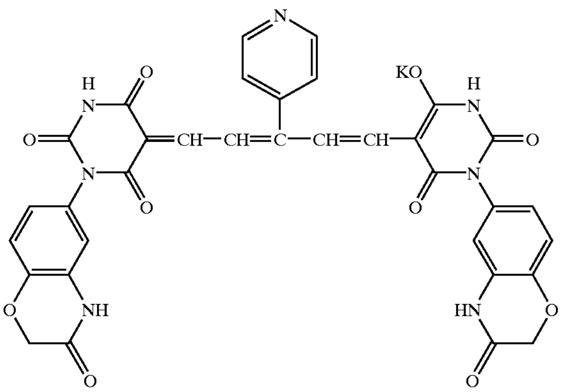
(II-9)
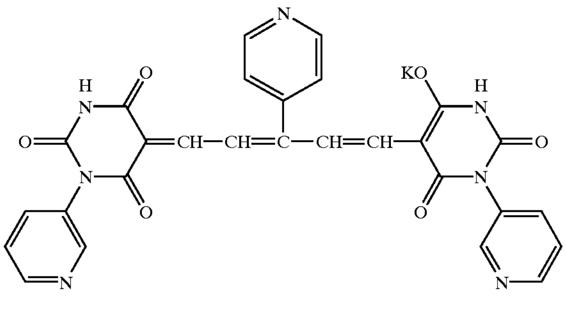
(II-10)
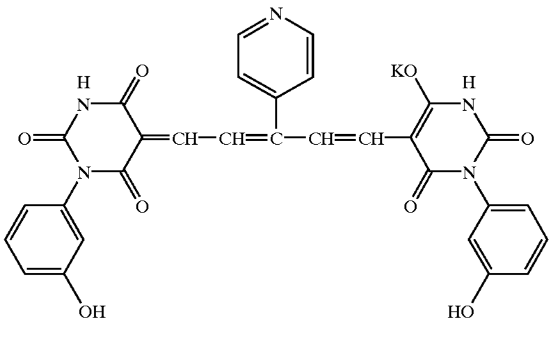

-continued (II-11)

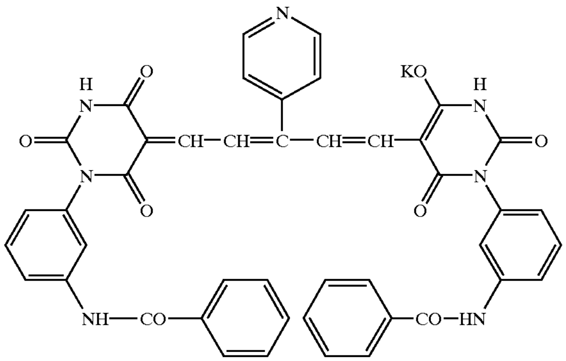

(II-12)

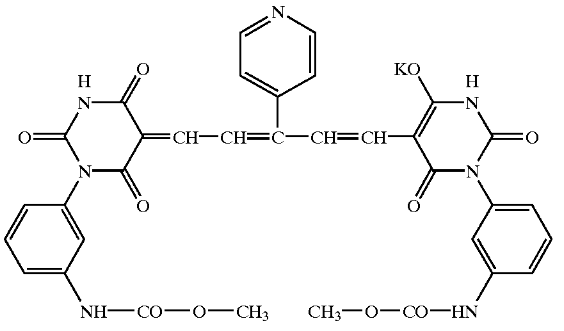

(II-13)

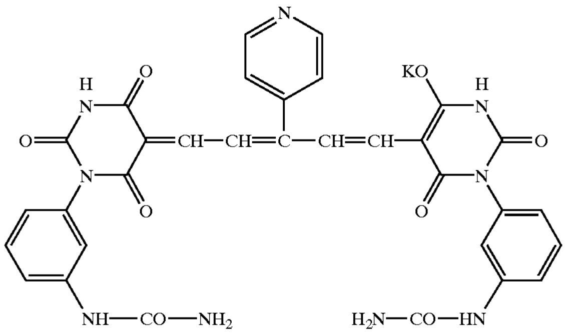

(II-14)

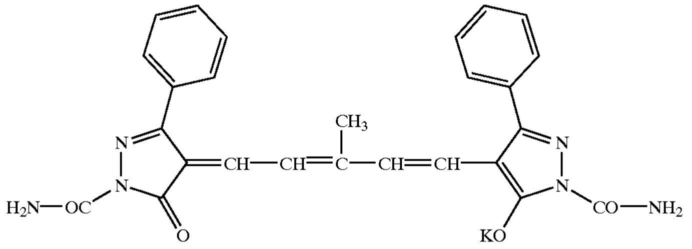

(II-15)

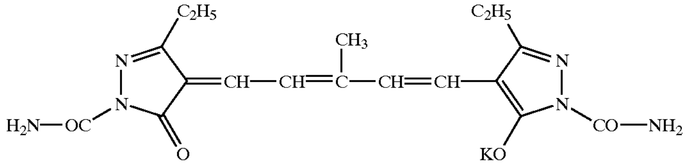

(II-16)

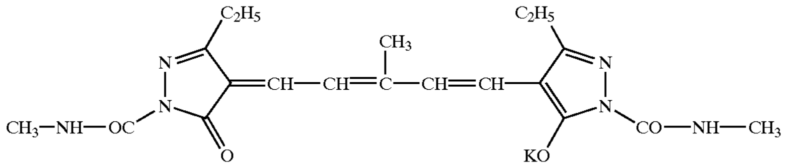

The oxonol dye can be synthesized by referring to the descriptions of Japanese Patent Provisional Publication No. 7(1995)-230671, European Patent No. 0,778,493 and U.S. Pat. No. 5,459,265.

The filter layer can have an absorption maximum in the wavelength region of 750 to 850 nm, another absorption maximum in the wavelength region of 851 to 950 nm, and a third absorption maximum in the wavelength region of 951 to 1,100 nm by using the above-described dyes. The filter layer preferably contains a methine dye in an aggregated form having an absorption maximum in the wavelength region of 750 to 850 nm, another methine dye in an aggregated form having an absorption maximum in the wavelength region of 851 to 950 nm, and a third methine dye in an aggregated form having an absorption maximum in the wavelength region of 951 to 1,100 nm. The methine dye having an absorption maximum in the wavelength region of 750 to 850 nm is preferably a cyanine dye represented by the formula (I) or an oxonol dye represented by the formula (II) in an aggregated form, and more preferably is an oxonol dye represented by the formula (II) in an aggregated form. The methine dye having an absorption maximum in the wavelength region of 851 to 950 nm or 951 to 1,100 nm is preferably a cyanine dye represented by the formula (I).

Each of the dyes (I-1) to (I-7), (I-14) and (II-1) to (II-16) in an aggregated form has an absorption maximum in the wavelength region of 750 to 850 nm. Each of the dyes (I-8), (I-10) to (I-12) and (I-15) in an aggregated form has an absorption maximum in the wavelength region of 851 to 950 nm. Each of the dyes (I-9), (I-13) and (I-20) to (I-23) in an aggregated form has an absorption maximum in the wavelength region of 951 to 1,100 nm.

The filter layer can further has an absorption maximum in the wavelength region of 560 to 620 nm to correct color of a displayed image. The absorption maximum in the wavelength region of 560 to 620 nm is preferably obtained by adding a dye to the filter layer.

The optical filter can also have a second filter layer, namely a visible light absorbing layer (absorption maximum wavelength: 560 to 620 nm) in addition to the above-mentioned filter layer, namely an infrared ray absorbing layer (absorption maximum wavelength: 750 to 1,100 nm). The absorption maximum in the wavelength region of 560 to 620 nm of the second filter layer is also preferably obtained by adding a dye to the second filter layer.

The absorption peak of the absorption maximum in the wavelength region of 560 to 620 nm is preferably sharp enough to cut off the light without affecting the green emission from the phosphor. The half-width of the peak is preferably in the range of 5 to 100 nm, more preferably in the range of 10 to 70 nm, and most preferably in the range of 10 to 50 nm.

The dye having an absorption maximum in the wavelength region of 560 to 620 nm is preferably used in an aggregated form. The definition of the aggregated form is the same as the definition described about the dye having an absorption maximum in the wavelength region of 750 to 1,100 nm.

The dye having an absorption maximum in the wavelength region of 560 to 620 nm is preferably represented by the following formula.

P=L=Q

In the formula, each of P and Q independently is an acidic nucleus, a basic nucleus or an aromatic nucleus; and L is a methine chain consisting of 1 to 5 conjugated methines or azomethines. Each bond represented by a combination of a solid line and a broken line means that the set of P and L or the set of Q and L is connected through a single bond or a double bond. The bond order is so determined that P, L and Q can be linked through a conjugated chain to form a chromophore. Each of P, L and Q can have a substituent group. Two or more substituent groups can be connected to form a four-membered to seven-membered ring. Examples of the rings formed by connecting substituent groups of L (methine chain) include cyclobutenone ring of a squarilium dye. Examples of the rings formed by connecting substituent groups of nucleus (P or Q) include xanthene ring and thioxanthene ring.

The acidic nucleus preferably is a cyclic ketomethylene structure or an open-chained structure having a methylene group between two electron-attractive groups, and more preferably is a cyclic ketomethylene compound. The cyclic ketomethylene structure can be condensed with a heterocyclic ring, an aromatic ring or an aliphatic ring. The cyclic acidic nucleus preferably is a heterocyclic ring rather than an aromatic ring. The acidic nucleus can be tautomeric. For example, the acidic nucleus can show ketoenol tautomerism in an oxonol dye. The acidic nucleus can similarly show imino-amino tautomerism where oxygen atom in keto-enol tautomerism is replaced with nitrogen atom. The acidic nucleus can also show thioketo-thiol tautomerism where oxygen atom in keto-enol tautomerism is replaced with sulfur atom. The acidic nucleus can be a dissociated form. Examples of the rings of the acidic nucleus and the condensed rings thereof include 2-pyrazoline-5-one, rhodanine, hydantoin, thiohydantoin, 2,4-oxazolidinedione, isooxazolone, barbituric acid, thiobarbituric acid, indandione, dioxopyrazolopyridine, hydroxypyridine, pyrazolidinedione, 2,5-dihydrofuran-2-one, pyrroline-2-one, pyrazolotriazole and pyrrolotriazole. The acidic nucleus can have a substituent group.

The basic nucleus has an open-chained structure or a cyclic structure. The cyclic structure is preferred to the open-chained structure. The cyclic structure can be condensed with a heterocyclic ring, an aromatic ring or an aliphatic ring. The cyclic structure preferably has a nitrogen-containing heterocyclic ring. The basic nucleus can be an onium form, which can be found in a cyanine dye. Examples of the nitrogen-containing heterocyclic rings and the condensed rings thereof include oxazole, isoxazole, benzoxazole, naphthoxazole, oxazolocarbazole, oxazolodibenzofuran, thiazole, benzothiazole, naphthothiazole, indolenine, benzoindolenine, imidazole, benzoimidazole, naphthoimidazole, quinoline, pyridine, oxazoline, pyrrolopyridine, pyrrole, furopyrrole, indolizine, imidazoquinoxaline and quinoxaline. The basic nucleus can have a substituent group.

The aromatic nucleus has an aromatic (hydrocarbon) ring or an aromatic heterocyclic ring. Examples of the aromatic hydrocarbon rings include benzene and naphthalene. Examples of the aromatic heterocyclic rings include pyrrole, indole, indolenine, benzoindolenine, carbazole, furopyrrole, thiophene, benzothiophene, furan, benzofuran, dibenzofuran, oxazole, benzoxazole, naphthoxazole, isoxazole, thiazole, benzothiazole, naphthothiazole, isothiazole, pyrazole, imidazole, indazole, naphthoimidazole, benzoimidazole, indolizine, quinoline, phenothiazine, phenoxazine, indoline, pyridine, pyridazine, thiadiazine, pyran, thiopyran, oxadiazole, benzoquinoline, thiadiazole, pyrrolothiazole, pyrrolopyridazine, pyrrolopyridine, imidazoquinoline, imidazoquinoxaline, tetrazole, coumarin and coumarone. The aromatic nucleus can have a substituent group. The aromatic nucleus preferably has amino, a substituted amino group, hydroxyl or an alkoxy group as a substituent group at a position where the substituent can be conjugated with the methine chain represented by L.

Examples of the dyes represented by the above-described formula include methine dyes (e.g., a cyanine dye, a merocyanine dye, an arylidene dye, an oxonol dye, a styryl dye), a diphenylmethane dye, a triphenylmethane dye, a xanthene dye, a squarilium dye, a croconium dye, an azine dye, an acridine dye, a thiazine dye and an oxazine dye.

The dye can be used in combination with a metal to form a metal complex. The dye can be improved in the durability where the dye is used in the form of the metal complex. A pyrromethene dye is preferably used in the form of the metal complex.

The dyes defined in the above-mentioned formula are described in WO00/23829, Japanese Patent Application Nos. 2000-40694, 2000-159820, 2000-261334, Japanese Patent Provisional Publication Nos. 11(1999)-92682, 11(1999)-227332, 11(1999)-255774, 11(1999)-256057, 2000-121807 and 2000-193802.

An oxonol dye or a cyanine dye is preferably used in an aggregated, and a cyanine dye is more preferably used in an aggregated form.

The cyanine dye (particularly in an aggregated form) is preferably represented by the formula (III).

(III)

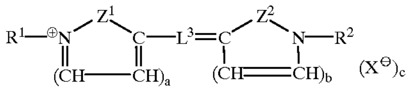

In the formula (III), each of $Z^1$ and $Z^2$ independently is a group of non-metallic atoms forming a five-membered or six-membered nitrogen-containing heterocyclic ring, which may be condensed with another ring. The definitions, examples and substituent groups are the same as those described about the formula (I).

In the formula (III), each of $R^1$ and $R^2$ independently is an aliphatic group or an aromatic group. The aliphatic group and the aromatic group are defined about the formula (I).

In the formula (III), $L^3$ is a methine chain consisting of three methines.

In the formula (III), each of a, b and c independently is 0 or 1.

In the formula (III), $X^1$ is an anion. The definitions and examples of the anion is the same as those described about the formula (I).

Examples of the dyes represented by the formula (III) are shown below.

(III-1)

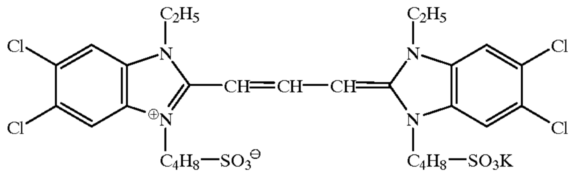

(III-2)

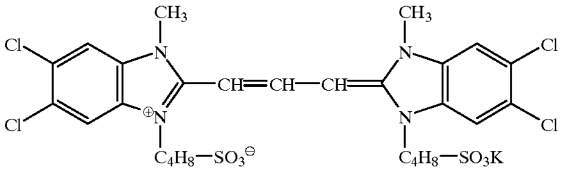

(III-3)

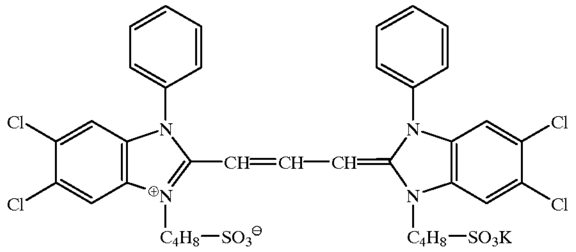

(III-4)

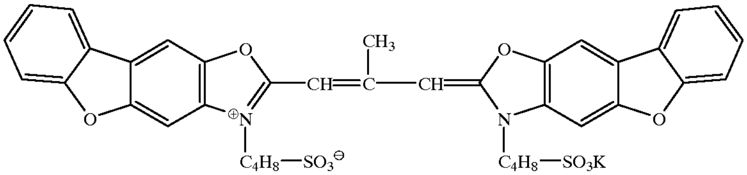

(III-5)

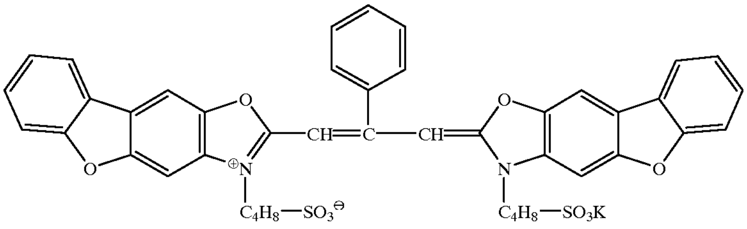

-continued (III-6)

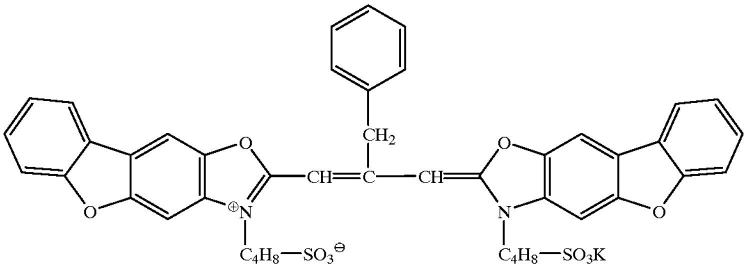

(III-7)

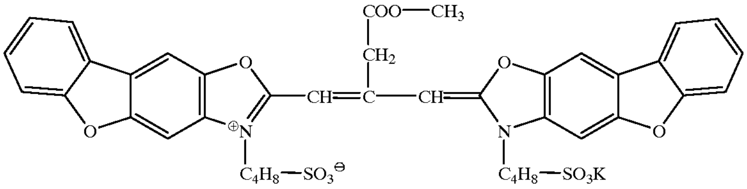

(III-8)

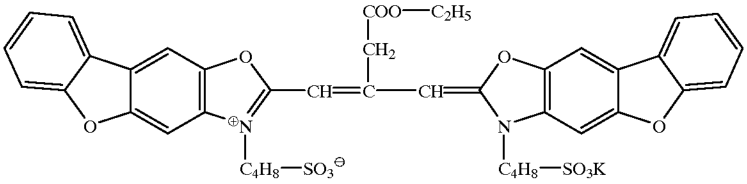

(III-9)

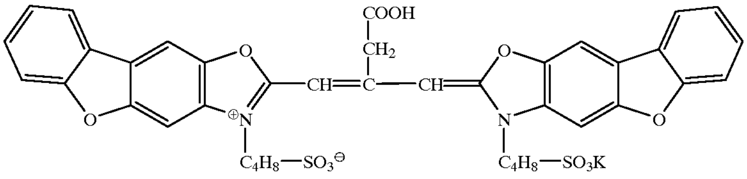

The filter layer of the optical filter can have another absorption maximum in the wavelength region of 500 to 550 nm. The transmittance at the absorption maximum in the wavelength region of 500 to 550 nm is preferably in the range of 20 to 85%.

The optical filter can also have a second filter layer, namely a visible light absorbing layer (absorption maximum wavelength: 500 to 550 nm) in addition to the above-mentioned filter layer, namely an infrared ray absorbing layer (absorption maximum wavelength: 750 to 1,100 nm).

The absorption maximum in the wavelength region of 500 to 550 nm has a function of adjusting intensity of green luminescence (which exhibits high luminosity) emitted from the phosphor. The absorption preferably cuts off the green luminescence gently. Therefore, the half width (the width of the wavelength region giving half of the maximum absorbance) of the absorption maximum in the wavelength region of 500 to 550 nm is preferably in the range of 30 to 300 nm, more preferably in the range of 40 to 300 nm, further preferably in the range of 50 to 150 nm, and most preferably in the range of 60 to 150 nm.

The absorption maximum in the wavelength region of 500 to 550 nm is preferably obtained by adding a dye to the filter layer or the second filter layer. The dye having an absorption maximum in the wavelength region of 500 to 550 nm is preferably in a non-aggregated form. A cyanine dye, a squarylium dye, an oxonol dye, a merocyanine dye, an arylidene dye, an azo dye, an azomethine dye, an anthraquinone dye, and metal chelate compounds thereof are preferably used as the dye having an absorption maximum in the wavelength region of 500 to 550 nm. The oxonol dye, the merocyanine dye, the arylidene dye, the azo dye, the azomethine dye and the anthraquinone dye are preferred.

The oxonol dye is described above, except that a non-aggregated form is preferred.

The merocyanine dye is defined by the following formula.

*Bs=Le-Ak*

In the formula, Bs is a basic nucleus; Ak is an acidic nucleus in a keto type; and Le is a methine chain consisting of an even number of methines.

The merocyanine dye (particularly in a non-aggregated form) is preferably represented by the formula (IV).

(IV)

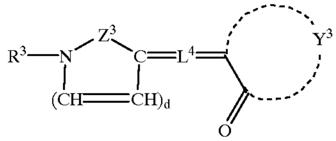

In the formula (IV), $Z^3$ is a group of non-metallic atoms forming a five-membered or six-membered nitrogen-containing heterocyclic ring, which may be condensed with another ring. The definitions, examples and substituent groups of $Z^3$ are the same as those described about $Z^1$ and $Z^2$ in the formula (I).

In the formula (IV), $R^3$ is an aliphatic group or an aromatic group. The aliphatic group and the aromatic group are defined about the formula (I).

In the formula (IV), $Y^3$ is a group of non-metallic atoms forming an aliphatic ring or a heterocyclic ring. The definitions, examples and substituent groups of $Y^3$ are the same as those described about $Y^1$ and $Y^2$ in the formula (II).

In the formula (IV), $L^4$ is a methine chain consisting of even number of methines. $L^4$ preferably is a methine chain consisting of two methines. The methine chain can have a substituent group. Examples of the substituent groups are the same as those described about $L^1$ in the formula (I).

In the formula (IV), d is 0 or 1.

The merocyanine dyes can be synthesized by referring to the descriptions of U.S. Pat. No. 2,170,806, and Japanese Patent Provisional Publication Nos. 55(1980)-155350 and 55(1980)-161232.

The arylidene dye is defined by the following formula.

*Ak=Lo-Ar*

In the formula, Ak is an acidic nucleus of a keto type; Ar is an aromatic nucleus; and Lo is a methine chain consisting of an odd number of methines.

The arylidene dye (particularly in a non-aggregated form) is preferably represented by the formula (V).

(V)

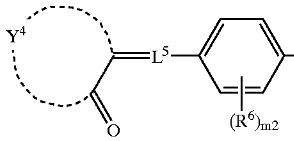

In the formula (V), $Y^4$ is a group of non-metallic atoms forming an aliphatic ring or a heterocyclic ring. The definitions, examples and substituent groups of $Y^4$ are the same as those described about $Y^1$ and $Y^2$ in the formula (II).

In the formula (V), each of $R^4$ and $R^5$ independently is an alkyl group or a substituted alkyl group. The definitions and examples of the alkyl group and the substituted alkyl group are the same as those described about the aliphatic group. $R^4$ and $R^5$ can be combined to form a heterocyclic ring. Examples of the heterocyclic rings include pyrrolidine ring, piperidine ring, piperazine ring and morpholine ring. $R^4$ and $R^5$ can be combined with $R^6$ to form a heterocyclic ring. Examples of the heterocyclic rings include julolidine ring, pyrrolidine ring and piperidine ring.

In the formula (V), $R^6$ is an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo and carboxyl. Hydrogen atom can be dissociated from carboxyl or sulfo. Carboxyl or sulfo can also be in the form of a salt.

In the formula (V), $L^5$ is a methine chain consisting of an odd number of methines. $L^5$ preferably is a methine chain consisting of one or three methines, and more preferably is a methine chain consisting of one methine. The methine chain may have a substituent group. The methine chain preferably has no substituent group.

In the formula (V), m2 is 0, 1, 2, 3 or 4.

The arylidene dyes can be synthesized by referring to the descriptions of European Patent No. 274723A1, and Japanese Patent Provisional Publication No. 62(1987)-106455.

The azo dye is a compound having an azo structure (—N=N— or =N—N= in some case) in its molecule.

The azo dye (particularly in a non-aggregated form) is preferably represented by the formula (VIa) or (VIb).

(VIa)

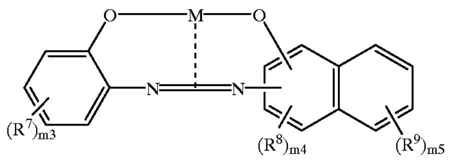

(VIb)

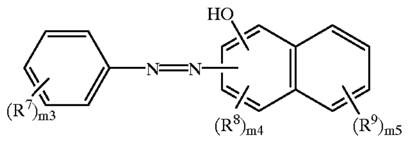

In the formula (VIa) or (VIb), each of $R^7$, $R^8$ and $R^9$ independently is an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo and carboxyl. Hydrogen atom can be dissociated from carboxyl or sulfo. Carboxyl or sulfo can also be in the form of a salt.

In the formula (VIa), M is a metal atom, preferably is a transition metal atom, more preferably is Fe, Co, Ni, Cu, Zn or Cd, and most preferably is Cu.

In the formula (VIa) or (VIb), each of m3 and m5 independently is 0, 1, 2, 3 or 4.

In the formula (VIa) or (VIb), m4 is 0, 1 or 2.

The azo dyes can be synthesized by referring to the descriptions of British Patent Nos. 539,703, 575,691, and U.S. Pat. No. 2,956,879.

The azomethine dye can be classified into a basic nucleus type and an acidic nucleus type. The basic nucleus type is preferred to the acidic nucleus type.

Basic nucleus type: Bs=N—Ar

Acidic nucleus type: Ak=N—Ar

In the formulas, Bs is a basic nucleus; Ak is an acidic nucleus of a keto type; and Ar is an aromatic nucleus.

The azomethine dye (particularly in a non-aggregated form) is preferably represented by the formula (VII).

(VII)

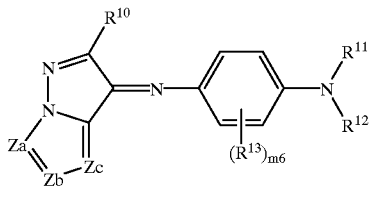

In the formula (VII), each of Za, Zb and Zc independently is —C($R^{14}$)=or —N=. Each of Za and Zc preferably is —N=. Zb preferably is —C($R^{14}$)=.

In the formula (VII), each of $R^{10}$, $R^{11}$, $R^{12}$, $R^{13}$ and $R^{14}$ independently is an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo and carboxyl. Hydrogen atom can be dissociated from carboxyl or sulfo. Carboxyl or sulfo can also be in the form of a salt. $R^{11}$ and $R^{12}$ can be combined to form a heterocyclic ring. Examples of the heterocyclic rings include pyrrolidine ring, piperidine ring, piperazine ring and morpholine ring. $R^{11}$ or $R^{12}$ can be combined with $R^{13}$ to form a heterocyclic ring. Examples of the heterocyclic rings include julolidine ring, pyrrolidine ring and piperidine ring.

In the formula (VII), m6 is 0, 1, 2, 3 or 4.

The azomethine dyes can be synthesized by referring to the descriptions of Japanese Patent Provisional Publication Nos. 62(1987)-3250, 4(1992)-178646, 5(1993)-323501.

The anthraquinone dye (particularly in a non-aggregated form) is preferably represented by the formula (VIIIa) or (VIIIb).

(VIIIa)

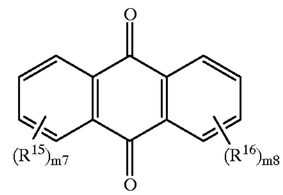

(VIIIb)

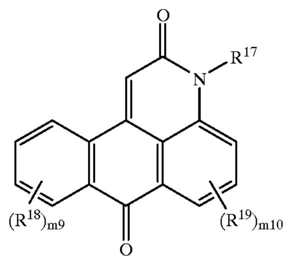

In the formula (VIIIa) or (VIIIb), each of $R^{15}$, $R^{16}$, $R^{18}$ and $R^{19}$ independently is an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo and carboxyl. Hydrogen atom can be dissociated from carboxyl or sulfo. Carboxyl or sulfo can also be in the form of a salt.

In the formula (VIIIb), $R^{17}$ is hydrogen, an alkyl group or a substituted alkyl group. The definitions and examples of the alkyl group and the substituted alkyl group are the same as those described about the aliphatic group.

In the formula (VIIIa) and (VIIIb), each of m7, m8 and m9 independently is 0, 1, 2, 3 or 4.

In the formula (VIIIb), m10 is 0, 1, 2 or 3.

The anthraquinone dyes can be synthesized by referring to the descriptions of British Patent No. 710,060, U.S. Pat. No. 3,575,704, and Japanese Patent Provisional Publication No. 48(1973)-5425.

The filter layer can further have an absorption maximum in the in the wavelength region of 350 to 450 nm or 470 to 530 nm to adjust color of a displayed image.

The optical filter can also have a second filter layer, namely a visible light absorbing layer (absorption maximum wavelength: 350 to 530 nm) in addition to the above-mentioned filter layer, namely an infrared ray absorbing layer (absorption maximum wavelength: 750 to 1,100 nm). The absorption maximum in the wavelength region of 350 to 450 nm or 470 to 530 nm is preferably obtained by adding a dye to the filter layer or the second filter layer. A squarilium dye, an azomethine dye, a cyanine dye, a merocyanine dye, an oxonol dye, an anthraquinone dye, an azo dye, an arylidene dye and metal chelate compounds thereof are preferably used as the dye having an absorption maximum in the wavelength region of 350 to 450 nm or 470 to 530 nm.

The filter layer can further contain an anti-fading agent, an oxidation inhibitor or an ultraviolet absorbing agent.

Examples of the anti-fading agents include hydroquinone derivatives (described in U.S. Pat. Nos. 3,935,016 and 0,982,944), hydroquinone diether derivatives (described in U.S. Pat. No. 4,254,216 and Japanese Patent Provisional Publication No. 55(1980)-21004), phenol derivatives (described in Japanese Patent Provisional Publication No. 54(1979)-145530), spiroindane or methylenedioxybenzene derivatives (described in British Patent Publication Nos. 2,077,455 and 2,062,888), chroman, spirochroman or coumaran derivatives (described in U.S. Pat. Nos. 3,432,300, 3,573,050, 3,574,627, 3,764,337 and Japanese Patent Provisional Publication Nos. 52(1977)-152225, 53(1978)-20327, 53(1978)-17729 and 61(1986)-90156), hydroquinone monoether or p-aminophenol derivatives (described in British Patent Publication Nos. 1,347,556, 2,066,975, Japanese Patent Publication No. 54(1979)-12337 and Japanese Patent Provisional Publication No. 55(1980)-6321), and bisphenol derivatives (described in U.S. Pat. No. 3,700, 455 and Japanese Patent Publication No. 48(1973)-31625).

Further, singlet oxygen quenchers and metal complexes (described in U.S. Pat. No. 4,245,018, and Japanese Patent Provisional Publication No. 60(1985)-97353) can be also used as the anti-fading agent. Examples of the singlet oxygen quencher include nitroso compounds (described in Japanese Patent Provisional Publication No. 2(1990)-300288), diimmonium compounds (described in U.S. Pat. No. 0,465,612), nickel complexes (described in Japanese Patent Provisional Publication No. 4(1992)-146189) and oxidation inhibitors (described in European Patent Publication No. 820057A1).

The filter layer has a thickness preferably in the range of 0.1 $\mu$m to 1 cm, more preferably in the range of 0.5 $\mu$m to 100 $\mu$m.

The filter layer further contains a binder polymer. Examples of the binder polymers include natural polymers (e.g., gelatin, cellulose derivatives, alginic acid) and synthesized polymers (e.g., polymethyl methacrylate, polyvinyl butyral, polyvinyl pyrrolidone, polyvinyl alcohol, polyvinyl chloride, styrene-butadiene copolymer, polystyrene, polycarbonate, water-soluble polyimide). Hydrophilic polymers (e.g., the natural polymers, polyvinyl butyral, polyvinyl pyrrolidone, polyvinyl alcohol, water-soluble polyimide) are preferred.

[Transparent Support]

The transparent support is preferably made of a polymer film. Examples of the polymers include cellulose esters (e.g., cellulose diacetate, cellulose triacetate, cellulose propionate, cellulose butyrate, cellulose acetate propionate, cellulose nitrate), polyamides, polycarbonates, polyesters (e.g., polyethylene terephthalate, polyethylene naphthalate, poly-1,4-cyclohexanedimethylene terephthalate, polyethylene-1,2-diphenoxyethane-4,4-dicarboxylate, polybutylene terephthalate), polyallylates (e.g., condensed product from bisphenol A and phthalic acid), polystyrenes (e.g., syndiotactic polystyrene), polyolefins (e.g., polypropylene, polyethylene, polymethylpentene), poly(meth)acrylates (e.g., polymethyl methacrylate), polysulfone, polyethersulfone, polyetherketone, polyether imide and polyoxyethylene. Cellulose triacetate, polycarbonates, polymethyl methacrylate, polyethylene terephthalate and polyethylene naphthalate are preferred.

The transparent support has a thickness preferably in the range of 5 $\mu$m to 5 cm, more preferably in the range of 25 $\mu$m to 1 cm, and most preferably in the range of 80 $\mu$m to 1.2 mm.

The transparent support has a transmittance preferably of more than 80%, and more preferably of more than 86%. The support has a haze preferably of less than 2.0%, and more preferably of less than 1.0%. The support has a refractive index preferably in the range of 1.45 to 1.70.

The support can contain an ultraviolet (UV) absorber. The amount of the ultraviolet absorber is preferably in the range of 0.01 to 20 wt. %, and more preferably 0.05 to 10 wt. % based on the total weight of the support.

The support can further contain particles of an inert inorganic compound as a slipping agent. Examples of the inorganic compound include $SiO_2$, $TiO_2$, $BaSO_4$, $CaCO_3$, talc and kaolin.

The support can be subjected to a surface treatment. Examples of the surface treatment include a chemical treatment, a mechanical treatment, a corona discharge treatment, a flame treatment, an ultraviolet treatment, a high-frequency wave treatment, a glow discharge treatment, an active plasma treatment, a laser treatment, a mixed acid treatment and an ozone-oxidation treatment. The glow discharge treatment, the ultraviolet treatment, the corona discharge treatment and the flame treatment are preferred, and the corona discharge treatment is more preferred.

[Undercoating Layer]

An undercoating layer can be provided between the transparent support and the filter layer. The undercoating layer is preferably made of soft polymer whose elastic co-efficient at room temperature is in the range of 1,000 to 1 MPa (preferably 800 to 5 MPa, more preferably 500 to 10 MPa).

The undercoating layer has a thickness preferably in the range of 2 nm to 20 $\mu$m, more preferably in the range of 5 nm to 5 $\mu$m, and most preferably in the range of 50 nm to 5 $\mu$m.

The polymer used for the undercoating layer preferably has a glass transition temperature in the range of −60° C. to 60° C. That polymer can be prepared, for example, by polymerization or copolymerization of vinyl chloride, vinylidene chloride, vinyl acetate, butadiene, neoprene, styrene, chloroprene, acrylic ester, methacrylic ester, acrylonitrile or methyl vinyl ether. Two or more undercoating layers can be provided, and preferably two undercoating layers are formed on the support.

[Anti-Reflection Layers]

The optical filter can have an anti-reflection layer, which preferably reduces the reflectance to not more than 3%, more preferably not more than 1.8%.

As the anti-reflection layer, a low refractive index layer is usually provided. The refractive index of the low refractive index layer is smaller than that of a layer provided below, and is preferably in the range of 1.20 to 1.55 (more preferably, 1.20 to 1.50). The low refractive index layer has a thickness of preferably 50 to 400 nm, and more preferably 50 to 200 nm.

Various kinds of low refractive index layer have been proposed, and are employable for the invention. Examples of them include a layer comprising fluorine-contained polymer of low refractive index (disclosed in Japanese Patent Provisional Publication Nos. 57(1982)-34526, 3(1991)-130103, 6(1994)-115023, 8(1996)-313702 and 7(1995)-168004), a layer formed by sol-gel method (disclosed in Japanese Patent Provisional Publication Nos. 5(1993)-208811, 6(1994)-299091 and 7(1995)-168003) and a layer containing fine particles (disclosed in Japanese Patent Publication No. 60(1985)-59250 and Japanese Patent Provisional Publication Nos. 5(1993)-13021, 6(1994)-56478, 7(1995)-92306 and 9(1997)-288201). The low refractive index layer containing fine particles may further contain micro voids among the particles. The void ratio in that layer is preferably in the range of 3 to 50 vol. %, and more preferably 5 to 35 vol. %.

Besides the low refractive index layer, layers having higher refractive indexes (i.e., middle and high refractive index layers) are preferably provided thereon to reduce the reflection in a wide wavelength region.

The high refractive index layer has a refractive index preferably in the range of 1.65 to 2.40, and more preferably in the range of 1.70 to 2.20. The middle refractive index layer has a refractive index between those of the low and high refractive index layers. The refractive index is preferably in the range of 1.50 to 1.90.

Each of the middle and high refractive index layers has a thickness preferably in the range of 5 nm to 100 $\mu$m, more preferably in the range of 10 nm to 10 $\mu$m, and most preferably in the range of 30 nm to 1 $\mu$m.

The haze of each layer is preferably in the range of not more than 5%, more preferably not more than 3%, further preferably not more than 1%.

The middle and high refractive index layers can be formed from a polymer having a relatively high refractive index. Examples of that polymer include polystyrene, styrene copolymer, polycarbonate, melamine resin, phenol resin, epoxy resin, and a polyurethane derived from the reaction between cyclic (alicyclic or aromatic) isocyanate and polyol. Further, other polymers having cyclic (aromatic, heterocyclic or alicyclic) groups and polymers substituted with a halogen atom except fluorine also have high refractive indexes. The polymer may be prepared by polymerization of monomers having double bonds for radical hardening.

For a higher refractive index, inorganic fine particles may be dispersed in the binder polymers. The inorganic fine particles preferably have a refractive index of 1.80 to 2.80.

As the materials for the particles, metal oxides and sulfides are preferred. Examples of them include titanium dioxide (rutile, mixed crystal of rutile/anatase, anatase, amorphous structure), tin oxide, indium oxide, zinc oxide, zirconium oxide and zinc sulfide. Preferred materials are titanium oxide, tin oxide and zirconium oxide. The inorganic fine particles may contain other elements, as well as those oxides or sulfides of main component. The 'main component' here means the component contained in the largest content (wt. %). Examples of the other elements include Ti, Zr, Sn, Sb, Cu, Fe, Mn, Pb, Cd, As, Cr, Hg, Zn, Al, Mg, Si, P and S.

The middle and high refractive index layers may be formed from liquid or soluble film-formable inorganic materials. Examples of the materials include alkoxides of various elements, salts of organic acids, coordination compounds (e.g., chelate compounds), and active inorganic polymers.

[Electromagnetic Wave Shielding Layer]

A layer having an effect of shielding an electromagnetic wave has a surface resistance preferably in the range of 0.01 to 500 Ω per square, and more preferably in the range of 0.01 to 10 Ω per square. The electromagnetic wave shielding layer preferably is a layer known as a transparent electroconductive layer, so as not to reduce the transmittance of the front plate.

The transparent electroconductive layer is made of, for example, metal, metal oxide or electroconductive polymer.

Examples of the metal for the transparent electroconductive layer include silver, palladium, gold, platinum, rhodium, aluminum, iron, cobalt, nickel, copper, zinc, ruthenium, tin, tungsten, iridium, lead and alloy thereof. Preferred metals are silver, palladium, gold, platinum, rhodium and alloy thereof. Particularly, alloy of silver and palladium is preferred, and the content of silver in the alloy is preferably in the range of 60 to 99 wt. %, more preferably in the range of 80 to 98 wt. %. The metal transparent electroconductive layer has a thickness preferably in the range of 1 to 100 nm, more preferably in the range of 5 to 40 nm, and most preferably in the range of 10 to 30 nm. If the thickness is less than 1 nm, the layer can not shield the filter from electromagnetic waves well. If the thickness is more than 100 nm, the layer insufficiently transmits visible light.

Examples of the metal oxide for the transparent electroconductive layer include tin oxide, indium oxide, antimony oxide, zinc oxide, ITO and ATO. The layer of metal oxide has a thickness preferably in the range of 20 to 1,000 nm, and more preferably in the range of 40 to 100 nm. The metal layer is preferably laminated on the metal oxide layer. It is also preferred that the metal and the electroconductive metal oxide be contained in the same layer.

For protecting and preventing the metal layer from oxidation and also for increasing the transmittance of visible light, a transparent metal oxide layer can be laminated. This transparent metal oxide may be electroconductive or not. Examples of the transparent metal oxide include oxides of 2- to 4-valent metals, zirconium oxide, titanium oxide, magnesium oxide, silicon oxide, aluminum oxide and metal alkoxides.

There is no particular restriction on the method for forming the transparent electroconductive layer and the transparent metal oxide layer. For example, the layer can be formed according to a spattering method, a vacuum evaporating method, an ion plating method, a plasma CVD method, a plasma PVD method, a superfine particle (of metal or metal oxide) coating method or a lamination of metal sheet.

[Other Layers]

The surface of the filter is preferably made to show anti-glare performance (which prevents the surface from reflecting the surrounding scene by scattering the incident light). For example, the anti-reflection layer may be formed on a finely roughened surface of a transparent film. Otherwise, the surface of the anti-reflection layer may be roughened by means of an embossing roll. The haze of the anti-reflection layer having such surface is generally in the range of 3 to 30%.

The optical filter can further comprise a hard coating layer, a slippery layer, a contamination preventive layer, an antistatic layer or an intermediate layer.

The hard coating layer preferably contains a cross-linked polymer, and can be formed from acrylic, urethane or epoxy polymer or oligomer (e.g., ultraviolet curable resin) or silica material.

On the top surface of the optical filter, a slippery layer may be provided. The slippery layer gives slipperiness to the surface of the optical filter, and improves the scratch resistance of the filter. The slippery layer can be formed from polyorganosiloxane (e.g., silicone oil), a natural wax, a petroleum wax, a metal salt of higher fatty acid, a fluorine lubricant or its derivative. The thickness of the slippery layer is preferably in the range of 2 to 20 nm.

The contamination preventive layer can be provided on the top surface of the anti-reflection layer. This layer lowers surface energy of the anti-reflection layer so that hydrophilic or oleophilic stains hardly attach onto the surface. The contamination preventive layer can be made of a fluorine containing polymer. The thickness of the layer is preferably in the range of 2 to 100 nm, and more preferably in the range of 5 to 30 nm.

The above-described layers such as the anti-reflection layer (low refractive index layer), the IR- or elecrtomagnetic wave shielding layer, the filter layer, the undercoating layer, the hard coating layer, the slippery layer, the contamination preventive layer and other layers can be formed by known coating methods. Examples of the coating method include dip coating, air knife coating, curtain coating, roller coating, wire bar coating, gravure coating, and extrusion coating with a hopper (described in U.S. Pat. No. 2,681,294).

Two or more layers can be formed according to a simultaneous coating method. The simultaneous coating method is described in U.S. Pat. Nos. 2,761,791, 2,941,898, 3,508,947 and 3,526,528; and ƛ Coating Engineering Ɨ pp.253, written by Y. Harazaki, published by Asakura Shoten (1973).

The layers can be also formed according to a spattering method, a vacuum evaporating method, an ion plating method, a plasma CVD method or a plasma PVD method.

[Use of Optical Filter]

The optical filter can be applied on a display device such as a liquid crystal display (LCD), a plasma display panel (PDP), an electroluminescence display (ELD) or a cathode ray tube display (CRT). The optical filter is remarkably effective in the plasma display panel (PDP) or the cathode ray tube display (CRT), and particularly effective in the plasma display panel (PDP).

A plasma display panel (PDP) comprises gas, glass substrates (front and back glass substrates), electrodes, electrode-lead member, thick film printing member, and phosphor. Each of the glass substrates is equipped with the electrode and an insulating layer. On the back glass substrate, a phosphor layer is further provided. The gas is enclosed between the substrates.

A front plate is a substrate placed in front of the plasma display panel. The front plate preferably has enough strength to protect the plasma display panel. The front plate can be directly attached on the display panel. Further, a gap can be formed between the front plate and the display panel.

The optical filter can be attached to the front plate. The optical filter can also be directly attached on the display panel. The filter can be directly attached on the display without using the front plate.

A plasma displaying apparatus means a displaying apparatus comprising at least a plasma display panel and a case. The front plate is also contained in the plasma displaying apparatus.

A plasma display panel (PDP) is commercially available. The plasma display panel (PDP) is described in Japanese Patent Provisional Publication Nos. 5(1993)-205643 and 9(1997)-306366.

EXAMPLE 1

(Preparation of Optical Filter)

Both surfaces of a biaxially stretched polyethylene terephthalate film (thickness: 175 μm) were subjected to a corona discharge treatment. Latex of styrene-butadiene copolymer (refractive index: 1.55, glass transition temperature: 37° C.) [LX407C5, Nippon Zeone Co., Ltd., ] was applied on both surfaces to form undercoating layers (thickness: 300 nm and 150 nm).

To 180 g of a 10 wt. % aqueous gelatin solution, 1N aqueous solution of sodium hydroxide was added to adjust the pH value at 7.0. To the solution, 24.5 $mg/m^2$ of the oxonol dye (II-7), 45.9 $mg/m^2$ of the cyanine dye (I-12) and 29.1 $mg/m^2$ of the cyanine dye (I-13) were added. The mixture was stirred at 30° C. for 24 hours. The prepared coating solution for filter layer was applied on the undercoating layer of 300 nm thickness to form a filter layer (dry thickness: 3.5 μm), and then dried at 120° C. for 10 minutes. Thus, an optical filter was prepared.

(Measurement of Absorbance)

The absorption spectrum of the obtained optical filter was measured. The measured spectrum had three absorption maximums at 810 nm, 904 nm and 985 nm. The transmittance at 810 nm was 5%, the transmittance at 905 nm was 1%, and the transmittance at 983 nm was 3%. The absorption maximums (λmax) of the dyes in solution are shown below.

Oxonol dye (II-7): 620 nm/DMF

Cyanine dye (I-12): 780 nm/$H_2O$

Cyanine dye (I-13): 836 nm/$H_2O$.

EXAMPLE 2

The procedure of Example 1 was repeated except that 25.5 $mg/m^2$ of the oxonol dye (II-4), 40 $mg/M^2$ of the cyanine dye (I-15) and 32 $mg/M^2$ of the cyanine dye (I-9) were used to prepare an optical filter.

The absorption spectrum of the obtained optical filter was measured. The measured spectrum had three absorption maximums at 818 nm, 914 nm and 1,000 nm. The transmittance at 818 nm was 6%, the transmittance at 914 nm was 3%, and the transmittance at 1,000 nm was 5%. The absorption maximums (λmax) of the dyes in solution are shown below.

Oxonol dye (II-4): 620 nm/DMF

Cyanine dye (I-15): 806 nm/$H_2O$

Cyanine dye (I-9): 804 nm/MeOH

EXAMPLE 3

The procedure of Example 1 was repeated except that 20 $mg/m^2$ of the cyanine dye (III-8), 24.5 $mg/m^2$ of the oxonol dye (II-7), 45.9 $mg/m^2$ of the cyanine dye (I-12) and 29.1 $mg/m^2$ of the cyanine dye (I-13) were used to prepare an optical filter.

The absorption spectrum of the obtained optical filter was measured. The measured spectrum had four absorption maximums at 595 nm, 810 nm, 904 nm and 985 nm. The transmittance at 595 nm was 30%, the transmittance at 810 nm was 5%, the transmittance at 905 nm was 1%, and the transmittance at 983 nm was 3%. The absorption maximums (λmax) of the dyes in solution are shown below.

Cyanine dye (III-8): 539 nm/MeOH

Oxonol dye (II-7): 620 nm/DMF

Cyanine dye (I-12): 780 nm/$H_2O$

Cyanine dye (I-13): 836 nm/$H_2O$

EXAMPLE 4

(Formation of Filter Layer)

To 180 g of a 10 wt. % aqueous gelatin solution, 1N aqueous solution of sodium hydroxide was added to adjust the pH value at 7.0. To the solution, 20 $mg/m^2$ of the cyanine dye (III-8), 24.5 $mg/m^2$ of the oxonol dye (II-7), 45.9 $mg/m^2$ of the cyanine dye (I-12), 29.1 $mg/M^2$ of the cyanine dye (I-13) and 120 $mg/M^2$ of the following oxonol dye (II-A) were added. The mixture was stirred at 30° C. for 24 hours. The thus-prepared coating solution for filter layer was applied on the undercoating layer of 300 nm thickness prepared in Example 1 to form a filter layer (dry thickness: 3.5 μm), and then dried at 120° C. for 10 minutes. Thus, an optical filter was prepared.

(II-A)

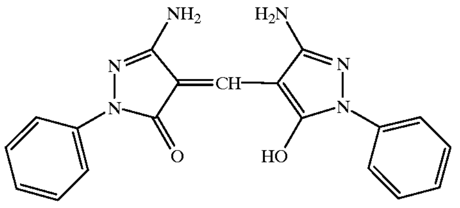

(Formation of Anti-Reflection Layer)

To 2.50 g of a reactive fluorocarbon polymer (JN-7219, JSR Co., Ltd.), 1.5 g of t-butanol was added. The mixture was stirred at room temperature for 10 minutes, and filtered through a polypropylene filter (porosity size: 1 μm) to prepare a coating solution. The solution was applied on the support surface opposite to the filter layer by means of a bar coater, to form a layer (dry thickness: 90 nm). The layer was dried and hardened at 120° C. for 3 minutes.

On the layer, a metal thin mesh with an acrylic adhesive was laminated. Thus, an optical filter was prepared.

The absorption spectrum of the obtained optical filter was measured. The measured spectrum had five absorption maximums at 400 nm, 595 nm, 810 nm, 904 nm and 985 nm. The transmittance at 400 nm was 35%, the transmittance at 595 nm was 30%, the transmittance at 810 nm was 5%, the transmittance at 905 nm was 1%, and the transmittance at 983 nm was 3%. The absorption maximums (λmax) of the dyes in solution are shown below.

Cyanine dye (III-8): 539 nm/MeOH

Oxonol dye (II-7): 620 nm/DMF

Cyanine dye (I-12): 780 nm/$H_2O$

Cyanine dye (I-13): 836 nm/$H_2O$

Oxonol dye (II-X): 396 nm/$H_2O$

COMPARISON EXAMPLE 1

The procedure of Example 1 was repeated except that any dyes were not used, to prepare an optical filter.

(Evaluation of Optical Filters)

A surface film of a front plate was removed from a commercially available plasma display panel (PDS4202J-H, Fujitsu Limited). In place of the surface film, each of the optical filters prepared in Examples was attached to the front plate with an adhesive. A remote-controlled TV set was placed in front of the display panel, and it was tested whether the display panel caused faulty working of the TV set or not. As a result, while the display panel equipped with the filter of Comparison Example often caused faulty working, the panel with the filter of the invention did not. Further, the filter of Example 3 gave a good contrast and improved white and red light. The filter of Example 4 corrected colors to give a gray displayed image.

The optical filter of the invention can selectively cut off infrared rays and light impairing color purity. Accordingly, the plasma display panel equipped with the optical filter of the invention is free from causing faulty working of remote-controlled apparatus, and the color balance of the panel can be properly corrected.

EXAMPLE 5

(Formation of Visible Light Absorbing Filter Layer)

To 180 g of a 10 wt. % aqueous gelatin solution, 1N aqueous solution of sodium hydroxide was added to adjust the pH value at 7.0. To the solution, 10 mg/M$^2$ of the cyanine dye (III-8) was added. The mixture was stirred at 30° C. for 24 hours. The prepared coating solution for visible light absorbing filter layer was applied on the undercoating layer of 300 nm thickness prepared in Example 1 to form a visible light absorbing filter layer (dry thickness: 1.3 $\mu$m), and then dried at 120° C. for 10 minutes.

(Formation of Infrared Ray Absorbing Filter Layer)

To 180 g of a 10 wt. % aqueous gelatin solution, 1N aqueous solution of sodium hydroxide was added to adjust the pH value at 7.0. To the solution, 24.5 mg/m$^2$ of the oxonol dye (II-7), 45.9 mg/M$^2$ of the cyanine dye (I-12), 29.1 mg/M$^2$ of the cyanine dye (I-13) and 120 mg/M$^2$ of the following azo dye (VI-A) were added. The mixture was stirred at 30° C. for 24 hours. The thus-prepared coating solution for infrared ray absorbing filter layer was applied on the visible light absorbing filter layer to form an infrared ray absorbing filter layer (dry thickness: 1.7 $\mu$m), and then dried at 120° C. for 10 minutes.

(IV-A)

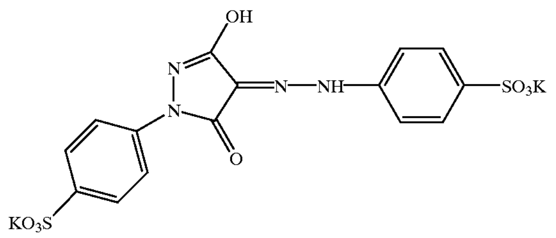

(Preparation and Evaluation of Optical Filter)

An antireflection layer was formed on the opposite side of the filter layers.

On the layer, a metal thin mesh with an acrylic adhesive was laminated. Thus, an optical filter was prepared.

The absorption spectrum of the obtained optical filter was measured. The measured spectrum is shown in FIG. 1.

We claim:

1. An optical filter which comprises a transparent support and a filter layer, wherein the filter layer has at least three absorption maximums in the wavelength region of 750 to 1,100 nm, each of said three absorption maximums being in the wavelength regions of 750 to 850 nm, 851 to 950 nm, and 951 to 1,100 nm, and wherein the filter layer contains a methine dye in an aggregated form and a binder polymer.

2. The optical filter as defined in claim 1, wherein the filter layer contains a methine dye in an aggregated form having an absorption maximum in the wavelength region of 750 to 850 nm, another methine dye in an aggregated form having an absorption maximum in the wavelength region of 851 to 950 nm, and a third methine dye in an aggregated form having an absorption maximum in the wavelength region of 951 to 1,100 nm.

3. The optical filter as defined in claim 2, wherein at least one of the methine dyes is a cyanine dye represented by the formula (I):

(I)

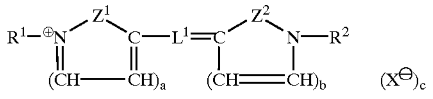

in which each of $Z^1$ and $Z^2$ independently is a group of non-metallic atoms forming a five-membered or six-membered nitrogen-containing heterocyclic ring, which may be condensed with another ring; each of $R^1$ and $R^2$ independently is an aliphatic group or an aromatic group; $L^1$ is a methine chain consisting of an odd number of methines; each of a, b and c independently is 0 or 1; and X is an anion.

4. The optical filter as defined in claim 3, wherein $L^1$ is a methine chain consisting of five or seven methines.

5. The optical filter as defined in claim 3, wherein the methine dye having an absorption maximum in the wavelength region of 851 to 950 nm or the methine dye having an absorption maximum in the wavelength region of 951 to 1,100 nm is a cyanine dye represented by the formula (I).

6. The optical filter as defined in claim 2, wherein the methine dye having an absorption maximum in the wavelength region of 750 to 850 nm is an oxonol dye represented by the formula (II):

(II)

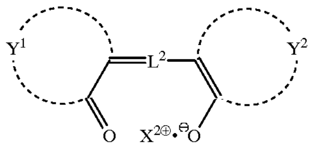

in which each of $Y^1$ and $Y^2$ independently is a group of non-metallic atoms forming an alicyclic ring or a heterocyclic ring; $L^2$ is a methine chain consisting of an odd number of methines; and $X^2$ is a proton or a cation.

7. The optical filter as defined in claim 6, wherein $L^2$ is a methine chain consisting of five methines.

8. The optical filter as defined in claim 1, wherein the optical filter has a transmittance in the range of 0.01 to 30% at each of the absorption maximums in the wavelength regions of 750 to 850 nm, 851 to 950 nm, and 951 to 1,100 nm.

9. An optical filter which comprises a transparent support and a filter layer, wherein the filter layer has at least three absorption maximums in the wavelength region of 750 to 1,100 nm, each of said three absorption maximums being in the wavelength regions of 750 to 850 nm, 851 to 950 nm, and 951 to 1,100 nm, wherein the filter layer contains a dye and a binder polymer, and wherein the filter layer further has a fourth absorption maximum in the wavelength region of 560 to 620 nm.

10. The optical filter as defined in claim 9, wherein the filter layer further contains a methine dye in an aggregated form having an absorption maximum in the wavelength region of 560 to 620 nm.

11. The optical filter as defined in claim 10, wherein the methine dye having an absorption maximum in the wavelength region of 560 to 620 nm is a cyanine dye represented by the formula (III):

(III)

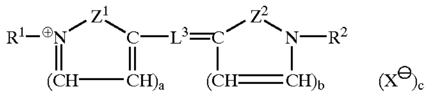

in which each of $Z^1$ and $Z^2$ independently is a group of non-metallic atoms forming a five-membered or six-membered nitrogen-containing heterocyclic ring, which may be condensed with another ring; each of $R^1$ and $R^2$ independently is an aliphatic group or an aromatic group; $L^3$ is a methine chain consisting of three methines; each of a, b and c independently is 0 or 1; and X is an anion.

12. An optical filter which comprises a transparent support and a filter layer, wherein the filter layer has at least three absorption maximums in the wavelength region of 750 to 1,100 nm, each of said three absorption maximums being in the wavelength regions of 750 to 850 nm, 851 to 950 nm, and 951 to 1,100 nm, wherein the filter layer contains a dye and a binder polymer, and wherein the optical filter further has a second filter layer further having an absorption maximum in the wavelength region of 560 to 620 nm.

13. The optical filter as defined in claim 12, wherein the second filter layer contains a methine dye in an aggregated form having an absorption maximum in the wavelength region of 560 to 620 nm.

14. The optical filter as defined in claim 13, wherein the methine dye having an absorption maximum in the wavelength region of 560 to 620 nm is a cyanine dye represented by the formula (III):

(III)

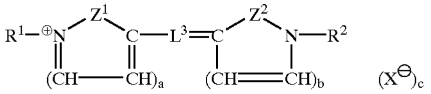

in which each of $Z^1$ and $Z^2$ independently is a group of non-metallic atoms forming a five-membered or six-membered nitrogen-containing heterocyclic ring, which may be condensed with another ring; each of $R^1$ and $R^2$ independently is an aliphatic group or an aromatic group; $L^3$ is a methine chain consisting of three methines; each of a, b and c independently is 0 or 1; and X is an anion.

15. A plasma display panel having a display surface covered with an optical filter which comprises a transparent support and a filter layer, wherein the filter layer has at least three absorption maximums in the wavelength region of 750 to 1,100 nm, each of said three absorption maximums is in the wavelength regions of 750 to 850 nm, 851 to 950 nm, and 951 to 1,100 nm, and wherein the filter layer contains a methine dye in an aggregated form and a binder polymer.

16. A plasma display panel having a display surface covered with an optical filter which comprises a transparent support and a filter layer, wherein the filter layer has at least three absorption maximums in the wavelength region of 750 to 1,100 nm, each of said three absorption maximums being in the wavelength regions of 750 to 850 nm, 851 to 950 nm, and 951 to 1,100 nm, wherein the filter layer contains a dye and a binder polymer, and wherein the filter layer further has a fourth absorption maximum in the wavelength region of 560 to 620 nm.

17. A plasma display panel having a display surface covered with an optical filter which comprises a transparent support and a filter layer, wherein the filter layer has at least three absorption maximums in the wavelength region of 750 to 1,100 nm, each of said three absorption maximums being in the wavelength regions of 750 to 850 nm, 851 to 950 nm, and 951 to 1,100 nm, wherein the filter layer contains a dye and a binder polymer, and wherein the optical filter further has a second filter layer further having an absorption maximum in the wavelength region of 560 to 620 nm.

18. The plasma display panel as defined in claim 17, wherein the dye is a methine dye in an aggregated form.

* * * * *